UNITED STATES PATENT OFFICE.

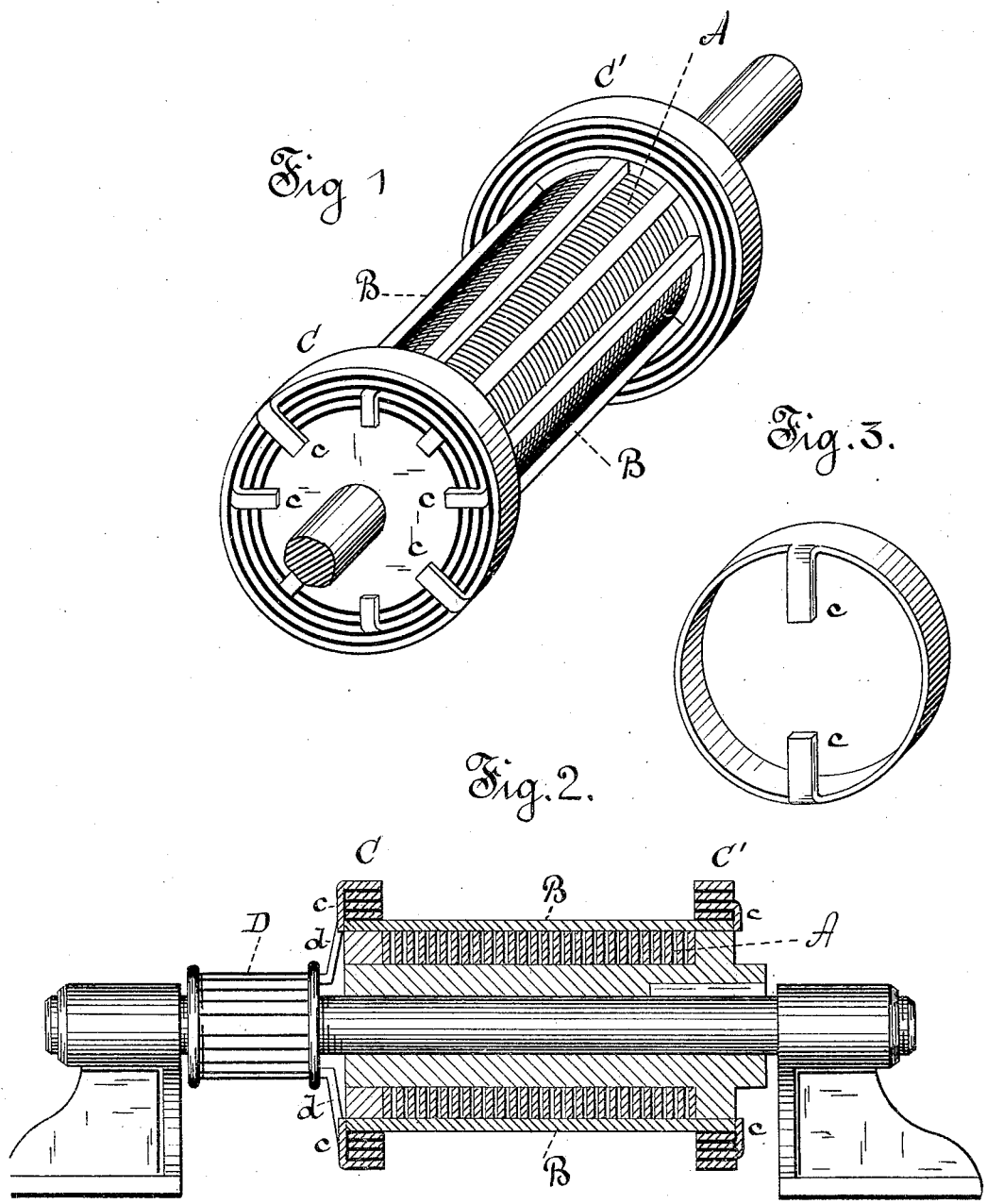

THOMAS A. EDISON, OF MENLO PARK, NEW JERSEY.

DYNAMO-ELECTRIC MACHINE.

SPECIFICATION forming part of Letters Patent No. 251,537, dated December 27, 1881.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines or Electric Engines; and I do hereby declare that the following is a full and exact description of the same, reference being had to the accompanying drawings, and to the letters of reference marked thereon.

The object I have in view is to produce simple and efficient means for connecting the naked copper inductive bars in dynamo or magneto electric machines or electric engines having cylindrical armatures, the same being an improvement upon the means shown for this purpose in Patent No. 242,898, granted to me June 14, 1881. This I accomplish by the use of two series of concentric insulated rings, which make multiple-arc connections between the bars at each end of the armature, and at the commutator end are themselves connected with the bars of the commutator-cylinder.

In the drawings, Figure 1 is a perspective view of the armature without the commutator-connections, only a few of the copper bars and concentric rings being shown to avoid confusion; Fig. 2, a longitudinal section through the armature, the commutator-cylinder being shown in elevation; and Fig. 3, a separate view of one of the rings.

The core A of the armature is built up, as described in my former applications, of disks or rings of iron separated by paper.

B represents the naked copper bars, arranged longitudinally on the core parallel with the axis of rotation, and insulated from such core and from each other. In practice the core is wholly or nearly covered by such bars.

C C' are the two series of concentric copper rings, located at the ends of the armature outside the polar extensions of the magnets, the rings of each series being insulated from each other. Each ring has two fingers, $c$, on its outer edge, which are bent inwardly for making connection with the inductive bars. At the commutator end of the machine each ring is connected with the bars of the commutator-cylinder D by an angular bar, $d$.

The connections of this machine are arranged symmetrically, preferably like those in the machine having a disk-armature, upon which I have already applied for a patent. At the commutator end each ring connects two opposite inductive bars, and has a connection midway with the commutator, while at the other end the terminal and initial bars of the pairs are connected symmetrically, so as to form a continually-closed multiple-arc circuit through all the bars, the current being divided at the negative commutator-brush, and each part passing through one half of the bars and meeting the other part of the current at the positive commutator-brush.

What I claim is—

1. In a dynamo or magneto electric machine or electric engine having a cylindrical armature, the concentric rings for connecting the inductive bars, substantially as set forth.

2. In a dynamo or magneto electric machine or electric engine, the combination, with the cylindrical armature-core, of the longitudinal inductive bars, two series of concentric rings, and commutator-connections, substantially as set forth.

This specification signed and witnessed this 25th day of June, 1881.

THOS. A. EDISON.

Witnesses:
RICHD. N. DYER,
WM. H. MEADOWCROFT.